United States Patent [19]
Felkner

[11] 3,836,162
[45] Sept. 17, 1974

[54] SELF-LEVELLING SUPPORT FOR REFRIGERATOR OR THE LIKE

[76] Inventor: Floyd R. Felkner, Rt. Box 2030, Ridgecrest, Calif. 93555

[22] Filed: Apr. 12, 1973

[21] Appl. No.: 350,382

[52] U.S. Cl. ................... 280/6 R, 108/7, 248/188.3, 280/6.1, 280/6.11
[51] Int. Cl. ............................................ B62d 37/00
[58] Field of Search ............ 180/82 R; 280/6 R, 6.1, 280/6.11; 248/188.3, 371, 393; 108/7, 6

[56] References Cited
UNITED STATES PATENTS

| | | | |
|---|---|---|---|
| 828,506 | 8/1906 | Rochford | 280/6 R |
| 1,463,406 | 7/1923 | Serrell | 280/6 R |
| 1,676,746 | 7/1928 | Reid | 108/7 |
| 1,820,436 | 8/1931 | Carlson | 108/7 |
| 3,103,368 | 9/1963 | Erickson | 280/6 R |

*Primary Examiner*—Robert R. Song
*Attorney, Agent, or Firm*—Herbert E. Kidder

[57] ABSTRACT

An automatic self-levelling device for supporting an appliance on a motor vehicle, where the appliance must be kept level for optimum performance, comprising a base, a first platform, and a second platform; said first platform being supported on the base for tilting about a first axis, and the second platform being supported on the first for tilting about a second axis at right angles to the first axis. Each of the platforms has a tilting mechanism including a reversible electric motor, and mercury switches on the platforms, which respond to any tilting of the platforms with respect to the horizontal about either axis, to energize the respective electric motor, thereby driving the tilting means in the direction to level the platforms. The levelling switches and electric motors are connected in a circuit to the battery and ignition switch of the car, so that the system is energized when the ignition switch is turned off, and de-energized when the ignition switch is turned on.

9 Claims, 6 Drawing Figures

SELF-LEVELLING SUPPORT FOR REFRIGERATOR OR THE LIKE

BACKGROUND OF THE INVENTION

The present invention pertains to a self-levelling device for supporting an appliance, such as a refrigerator, stove, or the like, on an automotive vehicle such as a camper, mobile home, or other recreational vehicle, so that the appliance will be automatically leveled for optimum operating efficiency whenever the vehicle is parked.

Most gas-operated refrigerators that are used in campers and the like, must be carefully levelled each time the car is parked, or else they will not work satisfactorily. This usually involves placing jacks at one or more corners of the vehicles and raising the respective corners until the vehicle is level, during which operation the transverse and fore-and-aft levels of the vehicle are checked periodically by means of spirit levels. This is a tedious and time-consuming procedures, and many times, the slope of the ground is such that it is virtually impossible to level the vehicle so that it is dead level. While levelling of the vehicle is desirable for physical comfort in walking, sitting, or lying within the vehicle, the primary reason for doing it is to make the refrigerator absolutely level so that it will operate efficiently. The tedious job of levelling the vehicle is particularly objectionable when the weather is bad, or when pulling into a campsite at a late hour, when the driver is tired and wants only to get some rest.

SUMMARY OF THE INVENTION

The primary object of the present invention is to provide a self-levelling device for supporting an appliance, such as a refrigerator, on an automotive vehicle, which device automatically levels the appliance without any effort on the part of the operator, each time that the ignition switch is turned off. The self-levelling action is automatic, and cannot be overlooked due to fatigue or forgetfulness on the part of the operator.

Another object of the invention is to provide a self-levelling device of the character described, that is relatively simple and inexpensive to manufacture, ruggedly constructed to withstand the stresses of driving over unimproved roads, and extremely compact, for use in the restricted space of campers or other recreational vehicles.

The foregoing and other objects and advantages of the invention will become apparent to those skilled in the art from the following detailed description of the preferred embodiments thereof, with reference to the accompanying drawings.

DESCRIPTION OF THE PREFERRED EMBODIMENTS

Figure 1:
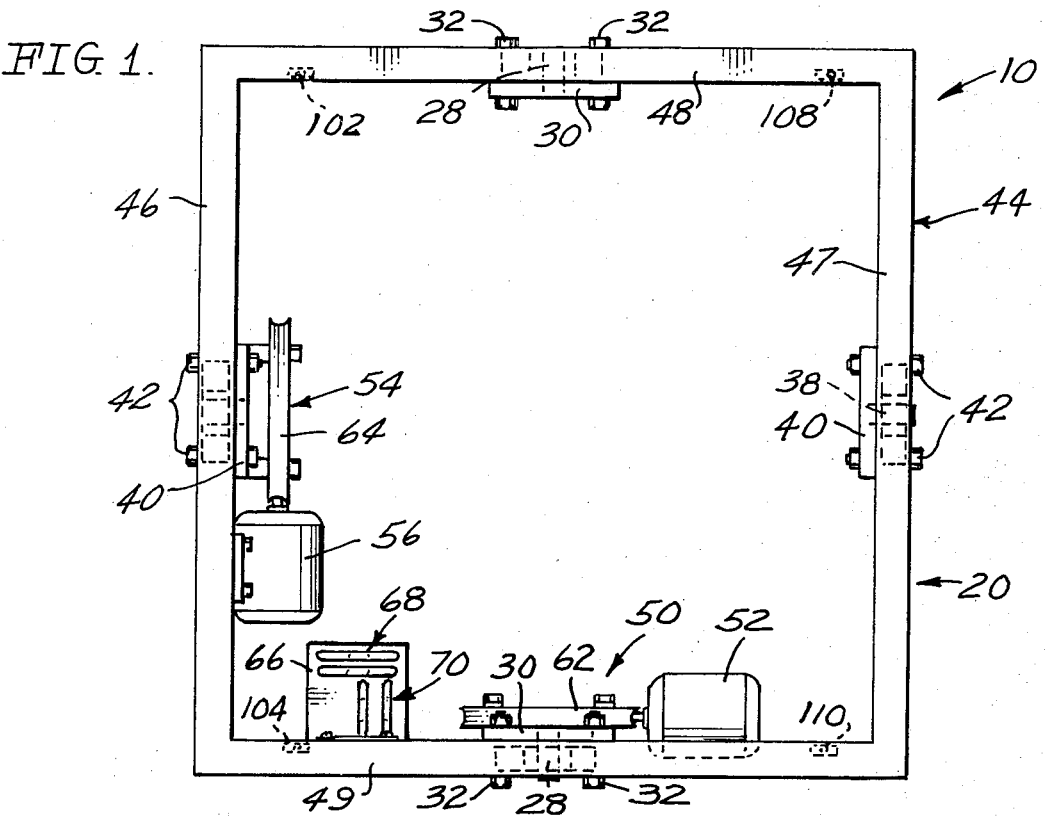
FIG. 1 is a top plan view of a self-levelling device embodying the invention.
Figure 2:
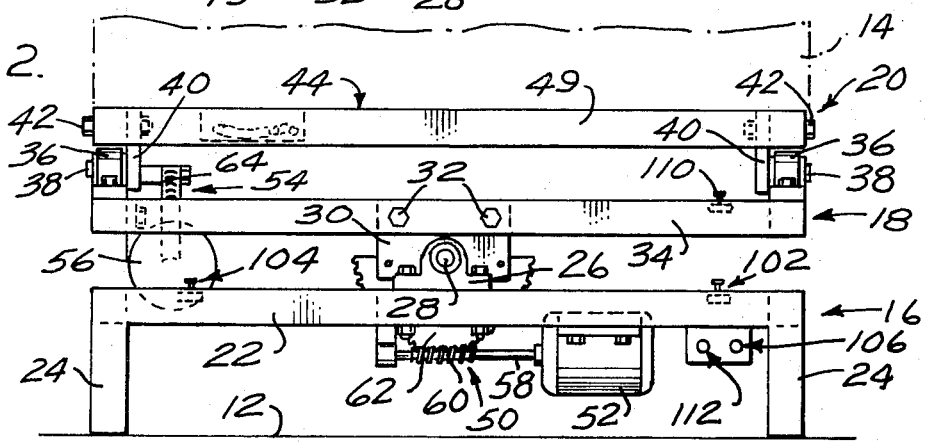
FIG. 2 is a side elevational view of the same.
Figure 3:
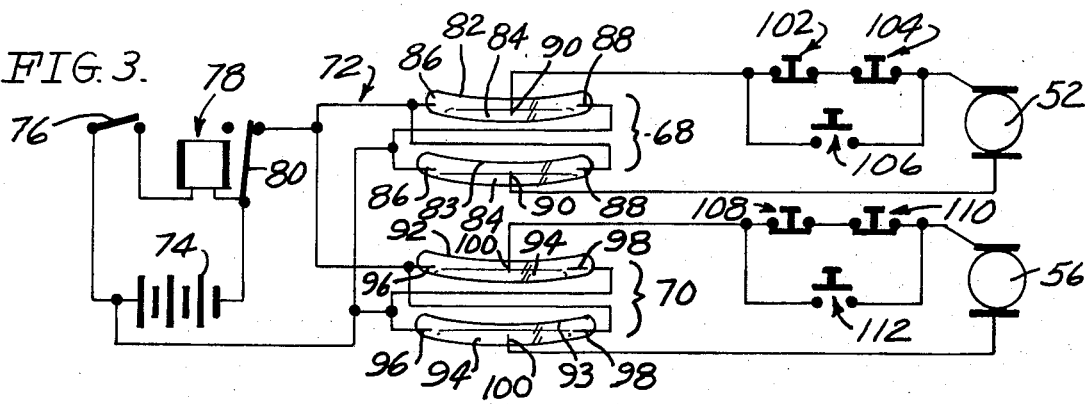
FIG. 3 is a schematic circuit diagram, showing the electrical circuit for operating the device.

Attention is directed first to FIGS. 1–3, inclusive, which show one embodiment of the invention. In this embodiment, the self-levelling device is designated in its entirety by the reference numeral 10. The device 10 is for use in a camper, mobile home, or other automotive recreational vehicle, of which only the floor 12 is shown in FIG. 2. Mounted on top of the supporting device is a refrigerator 14 (FIG. 2), or any other appliance that needs to be levelled. Since the operating efficiency of a gas absorption-type refrigerator is critically effected by even the slightest tilt of the refrigerator mechanism, it will generally be true that only such a refrigerator is the appliance needing to be levelled accurately, and the appliance 14 will therefore be referred to hereinafter as a refrigerator.

The device 10 comprises a base 16, a first platform 18, and a second platform 20, arranged one above the other, as seen in FIG. 2. The base 16 comprises an orthogonal frame 22, made up of welded square tubing, the length and width of which are substantially the same as the length and width of the refrigerator 14. At the four corners of the frame 22 are vertical legs 24, which stand on the floor 12. Mounted on two opposite sides of the frame 22 at the midpoints thereof are two pillow blocks 26, having bearings in which pivot shafts 28 are journaled. The pivot shafts 28 are rigidly secured to and project laterally outward from vertical plates 30, which are secured by bolts 32 to the frame members of the first platform 18 directly above the base.

The first platform 18 comprises a flat, orthogonal frame 34, made up of welded square tubing, substantially identical in plan-form to frame 22, and mounted on two opposite sides of the frame 34 at 90° angular spacing from the pillow blocks 26 are two other pillow blocks 36, which have bearings that receive pivot shafts 38. Pivot shafts 38 are fixed to and project laterally outward from vertical plates 40, that are secured by bolts 42 to the frame members of the second platform 20, directly above the first platform.

The second platform 20 also comprises an orthogonal frame 44 of welded square tubing, to which the base of the refrigerator 14 is bolted or otherwise secured. Frame 44 is seen in plan view in FIG. 1 and comprises side members 46, 47 and end members 48, 49. Plates 40 are attached to the frame sides 46, 47, respectively, and pillow blocks 46 are mounted on the corresponding side members of frame 34 (first platform 18) lying directly below sides 46, 47. In like manner, plates 30 are attached to the side members of frame 34 (first platform 18) that lie below sides 48 and 49, in the same vertical planes as the latter, while pillow blocks 26 are mounted on the corresponding side members of frame 22 (base 16).

Tilting of the first platform 18 is accomplished by first tilting means 50, which include a first reversible electric motor 52. The second platform 20 is tilted by second tilting means 54, which includes a second reversible electric motor 56. Each of the motors 52, 56, has a drive shaft 58 with a worm gear 60 mounted thereon, only one of which can be seen in the drawing (FIG. 2). However, it will be understood that the drive shaft and worm gear of motor 56 are exactly the same as their counterparts in motor 52. Worm gear 60 of motor 52 meshes with a gear 62 that is arranged concentric with the center of pivot shafts 28, and is rigidly secured to plate 30 by means of bolts. The worm gear of motor 56 likewise meshes with a gear sector 64 which is concentric with the centers of pivot shafts 38, and is secured rigidly to the plate 40 on side member 46.

Fixedly mounted on one of the end frame members 49 of the second platform 20, is an L-shaped, horizontal shelf 66, upon which are mounted first switch means 68 and second switch means 70. The switch means 68,70 and the electric motors 52,56 are connected by circuit means 72 to the battery 74 and ignition switch 76 of the vehicle, as shown in FIG. 3.

The circuit means 72 includes switch means 78 for opening the circuit of the self-levelling device whenever the ignition switch is turned on, and for closing the circuit when the ignition switch is turned off. The switch means 78 might take various forms, such as a solid-state circuit, but for convenience of illustration is herein shown as a relay coil that actuates a switch 80, which opens or closes the circuit, as the ignition switch is turned on or off, respectively.

The first levelling switch means 68 comprises two parallel, horizontally extending, arcuate tubes 82, 83, each of which has its midpoint lower than the ends. Contained within the tubes are mercury pools (or globules) 84, which tend to move toward one end or the other of the tube when the tube is tilted. Projecting into the ends of the tubes 82, 83 are electrical contacts 86, 88, while a third contact 90 projects down into each of the tubes at its midpoint. The end contacts of the two tubes 82, 83, are interconnected, and connected to the terminals of the motor 52, as shown in FIG. 3.

The levelling switch means 70 also comprises two parallel, horizontally extending, arcuate tubes 92, 93, the midpoints of which are lower than their respective ends, and each of which has a pool or globule 94 of mercury contained within it. Projecting into the ends of the tubes 93, 92 are electrical contacts 98 and 96, and a third contact 100 projects into the midpoints of the tubes, all as shown in FIG. 3. The contacts of the tubes 93, 92 are also interconnected and connected to the terminals of the second motor 56, so that the same can be driven in one direction or the other, depending upon which way the tubes 92, 93 are tilted.

Also mounted on the first platform 18 on opposite sides of the pivot shaft 28, near the outer extremities of the frame, are two normally-closed limit switches 102 and 104. These limit switches may be conventional microswitches, which are engaged and actuated by the first platform 18, when the latter reaches the extremity of its angular travel in one direction, and is about to strike the frame 22 of the base. Switches 102, 104 are connected into the circuit 72, as shown in FIG. 3, and if either of them is opened, motor 52 is stopped. A normally-open, manual over-ride switch 106 is provided in parallel around switches 102 and 104, to enable the operator to drive the motor 52 in the appropriate direction to level the device after the vehicle has been approximately levelled by driving it onto a relatively level portion of ground. When the vehicle is thus more or less levelled, the tilting switches 68 will actuate motor 62, sending the current through over-ride switch 106, until the opened limit switch 102, 104 has closed.

A second pair of normally-closed limit switches 108, 110, are mounted on the second frame 34, on opposite sides of the pivot shafts 38, where they are engaged and actuated by the second platform 20, when the latter reaches the end of its angular travel in either direction. Switches 108 and 110 are connected into the circuit 72, as shown in FIG. 3, and a normally-open manual over-ride switch 112 is provided in parallel with these switches so that the motor 56 can be operated in the direction to level the second platform once the vehicle has been more or less levelled by driving it onto relatively flat ground.

The operation of the invention is believed to be more or less self-evident from the foregoing description, taken with the drawings. Each time that the ignition switch 76 is turned off, relay 78 is de-energized, allowing switch 80 to close, thereby sending current from battery 74 to the circuit 72. If the vehicle is tilted slightly, the mercury pools 84 in tilt switches 68 flow toward one end or the other of tubes 82, 83 and at the same time, mercury pools 94 flow toward one end or the other of tubes 92, 93. With the mercury pool at one end of the tube, electrical current is transmitted from the center electrode 90, 100 to the end electrode of the tube which is also immersed in the mercury, thereby sending current to the motors 52 and 56 in the direction to drive the first tilting means 50 and second tilting means 54 in the direction to level platforms 18 and 20, respectively. As the second platform 20 reaches the dead-level condition, the mercury pools become centered in the tubes, and neither of the end electrodes in any of the tubes is immersed in the mercury, and therefore carry no current. Centering of the mercury pools in the tubes thus causes the two motors 52,56 to stop, which occurs only when the refrigerator 14 is dead-level.

If the vehicle should be tilted so far over to one side or the other, that the platforms 18, 20 are not able to tilt far enough to bring them to the level condition, one or the other of the limit switches 102, 104, 108, 110, will be opened, causing the two motors to stop before any damage is done. The situation can then be remedied, if necessary, by driving the vehicle to another campsite that is more nearly level, so that the tilting of the platforms 18 and 20 will be within the angular range required to make them level.

When the operator of the vehicle turns the ignition switch 76 on, at the start of the next days' drive, relay coil 78 is energized, opening switch 80, which breaks the circuit from the battery to the system, so that the device will not try to keep levelling itself as the vehicle travels down the highway.

Figure 4:
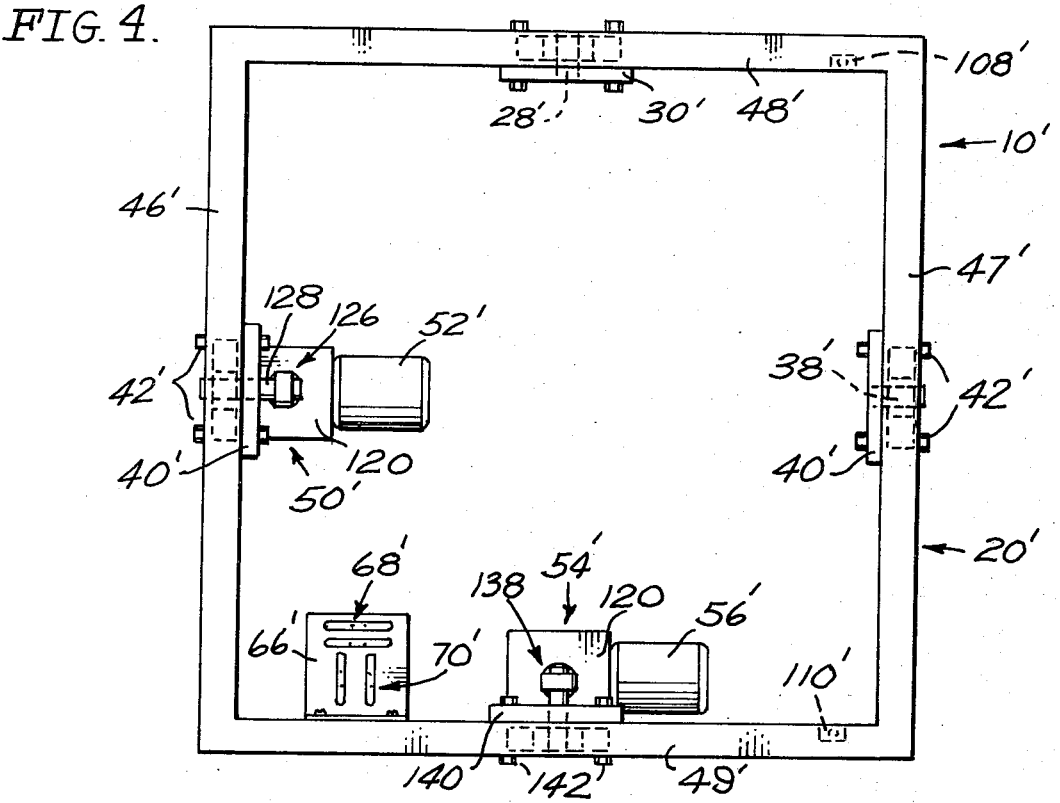
FIG. 4 is a plan view of another embodiment of the invention.
Figure 5:
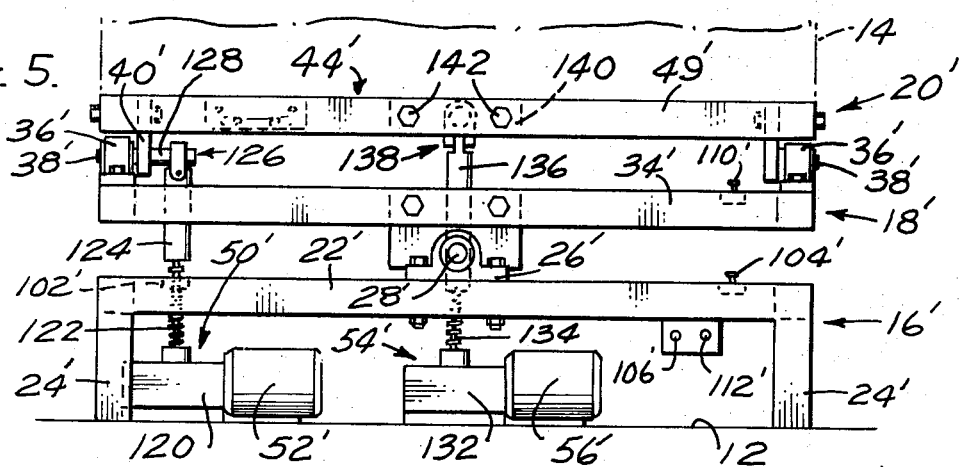
FIG. 5 is a side elevational view of the embodiment shown in FIG. 4.
Figure 6:
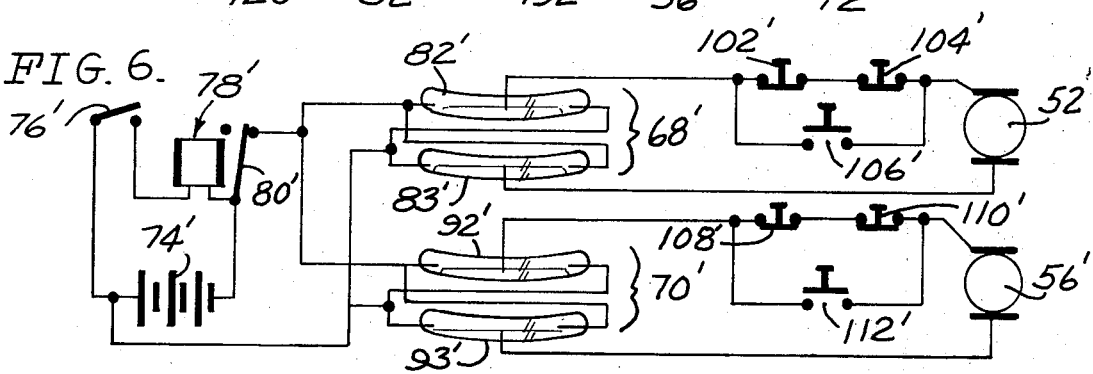
FIG. 6 is a circuit diagram for the embodiment of FIGS. 4 and 5.

Another embodiment of the invention is shown in FIGS. 4–6, to which attention is now directed. In this embodiment, parts that are substantially identical to their counterparts in FIGS. 1–3 are given the same reference numerals, with the prime (') suffixed. The chief difference between the two embodiments is that first tilting means 50' and second tilting means 54', each comprises a motor-driven screw jack, instead of the worm-and-gear arrangement shown in FIGS. 1–3.

First tilting means 50' comprises a screw jack 120 having a speed reduction gearbox, with means inside (not shown) for driving a vertical lead screw 122, which extends up into and engages the internal threads of an elongated, tubular nut 124. The upper end of tubular nut 124 is connected by a flexible joint 126 to an inward extension 128 of the pivot shaft 38' journaled in a pillow block 36'. Thus, as the screw 122 turns within the nut 124 the connection 128 is raised or lowered, tilting the first platform 18' about its pivot axis 28'. The connection of screw jack 120 to first platform 18' is spaced horiaontally outward from the pivot axis 28, so that it has a long moment arm for maximum effectiveness.

The second tilting means 54' also comprises a screw jack 132 having a speed reduction gearbox and means within for turning a vertical screw 134 which extends up into and meshes with an elongated tubular nut 136. The upper end of tubular nut 136 is connected by a flexible joint 138 to a mounting bracket 140, which is secured by bolts 142 to frame member 49' of the second platform 20'. Thus, when the jack screw 134 turns within nut 136, frame 44' is tilted about its pivot shafts 38', to tilt the second platform. Both of the screw jacks 120 and 132 are solidly mounted on the vehicle floor 12, and thus transmit any stresses from their respective platforms to the floor of the vehicle, without stressing the pivot shafts or other connections.

The electrical circuit of FIG. 6 is substantially identical to that shown in FIG. 3, and therefore need not be described again. The mode of operation of this embodiment is essentially the same as in the case of the ambodiment of FIGS. 1–3. When the vehicle is stopped and the ignition switch 76' is turned off, relay 78' closes the circuit, sending current through the tilting switches 68' and 70' to the motors 52', 56', driving the tilting means 50' and 54' in the correct direction to level the platforms 18' and 20'. When the second platform 20' reaches the dead-level condition, the motors 52' and 54' are shut off.

While I have shown and described in considerable detail what I believe to be the preferred embodiments of my invention, it will be understood by those skilled in the art that the invention is not limited by such details, but may take various other forms within the scope of the following claims.

What I claim is:

1. A self-levelling device for supporting a refrigerator or the like on an automotive vehicle having a battery and an ignition switch, so that the refrigerator will be automatically levelled for maximum operating efficiency whenever the vehicle is parked in a tilted condition and the ignition switch is turned off, said device comprising:

a base mounted on said vehicle;

a first platform pivotally mounted on said base for rocking movement about a first horizontal axis;

a second platform pivotally mounted on said first platform for rocking movement about a second horizontal axis at right angles to said first axis, said refrigerator being mounted on said second platform;

first tilting means connected to said first platform and operable, when energized, to tilt the first platform about said first axis, said first tilting means including a first reversible electric motor;

second tilting means connected to said second platform and operable, when energized, to tilt the second platform about said second axis, said second tilting means including a second reversible electric motor;

first switch means responsive to tilting of said second platform with respect to the horizontal plane in one direction, for energizing said first electric motor to drive said first tilting means in the direction to level said first platform about said first axis;

second switch means responsive to tilting of said second platform with respect to the horizontal plane in the direction at right angles to said one direction, for energizing said second electric motor to drive said second tilting means in the direction to level said second platform about said second axis; and circuit means connecting said switch means and said electric motors to the battery and ignition switch of said vehicle, said circuit means including means actuated by the ignition switch to open the circuit when the ignition switch is turned on, and to close the circuit when the switch is turned off.

2. The device of claim 1, wherein said first tilting means includes a first worm gear driven by said first motor and meshing with a first gear fixed to said first platform; and said second tilting means includes a second worm gear driven by said second motor and meshing with a second gear fixed to said second platform.

3. The device of claim 1, wherein said first tilting means includes a first jack driven by said first motor and connected to one side of said first platform at a distance from said first axis; and said second tilting means includes a second jack driven by said second motor and connected to one side of said second platform at a distance from said second axis.

4. The device of claim 1, wherein said first and second switch means are mounted on said second platform so that they tilt with the latter.

5. The device of claim 1, wherein said first and second switch means comprises at least two mercury switches disposed at right angles to one another, each of which is operable, when tilted in one direction, to drive its respective electric motor in one direction, and when tilted in the other direction, to drive its respective motor in the opposite direction.

6. The device of claim 1, wherein said first and second switch means comprise at least two mercury switches mounted on said second platform, each of said mercury switches comprising a generally horizontally extending, arcuate tube, the midpoint of which is lower than the ends, with a mercury pool contained within said tube, and electrical contacts at opposite ends of the tube that are immersed in said mercury when the tube is tilted one way or the other, thereby causing current to be sent to the associated electric motor to drive the same in one direction or the other.

7. The device of claim 2, wherein said first and second switch means comprise mercury switches mounted on said second platform.

8. The device of claim 3, wherein said first and second jacks have their bases solidly mounted on said vehicle, whereby any shock loads transmitted to said jacks are transferred directly to the vehicle.

9. The device of claim 8, wherein said first and second switch means comprise at least two mercury switches mounted on said second platform at right angles to one another, each of said mercury switches comprising a generally horizontally extending tube having a globule of mercury contained therein, and electrical contacts that are immersed in said mercury when the tube is tilted one way or the other; one of said tubes being disposed perpendicular to one of said axes, and the other tube being disposed perpendicular to the other axis.

* * * * *